United States Patent
Sodhi et al.

(10) Patent No.: US 12,118,406 B2
(45) Date of Patent: Oct. 15, 2024

(54) INTERACTIVE AUGMENTED REALITY BASED OPTIMIZATION OF MACHINE LEARNING MODEL EXECUTION ON HYBRID CLOUD

(71) Applicant: KYNDRYL, INC., New York, NY (US)

(72) Inventors: Manjit Singh Sodhi, Bangalore (IN); Prerna Agarwal, New Delhi (IN); Shridhar Gurunath Domanal, Bengaluru (IN); Sri Harsha Varada, Vizianagaram (IN)

(73) Assignee: Kyndryl, Inc., New York, NY (US)

( * ) Notice: Subject to any disclaimer, the term of this patent is extended or adjusted under 35 U.S.C. 154(b) by 558 days.

(21) Appl. No.: 17/443,983

(22) Filed: Jul. 29, 2021

(65) Prior Publication Data

US 2023/0032748 A1    Feb. 2, 2023

(51) Int. Cl.
*G06F 9/50* (2006.01)

(52) U.S. Cl.
CPC ...... *G06F 9/5072* (2013.01); *G06F 2209/501* (2013.01); *G06F 2209/503* (2013.01); *G06F 2209/508* (2013.01)

(58) Field of Classification Search
CPC ............. G06F 9/5072; G06F 2209/501; G06F 2209/503; G06F 2209/508
See application file for complete search history.

(56) References Cited

U.S. PATENT DOCUMENTS

| | | | |
|---|---|---|---|
| 9,007,473 B1 | 4/2015 | Worley, III | |
| 11,245,640 B1* | 2/2022 | Maurya | G06F 18/217 |
| 11,537,439 B1* | 12/2022 | Liberty | G06F 9/5077 |
| 11,588,750 B1* | 2/2023 | Gazzetti | G06F 9/5072 |
| 11,817,091 B1* | 11/2023 | Singh | G10L 15/22 |
| 11,848,847 B1* | 12/2023 | Guo | H04L 67/10015 |
| 2008/0005702 A1* | 1/2008 | Skourup | G06F 3/011 |
| | | | 715/848 |

(Continued)

OTHER PUBLICATIONS

Augmented reality—Wikipedia, dated Jul. 5, 2021 (Year: 2021).*

(Continued)

*Primary Examiner* — Benjamin C Wu
(74) *Attorney, Agent, or Firm* — CANTOR COLBURN LLP; Dan Housley (57) ABSTRACT

According to one embodiment, a method, computer system, and computer program product for cloud service brokerage. The embodiment may include receiving a data set and user defined contextual parameters relating to a machine learning (ML) problem of a user to be performed on the data set. The embodiment may include identifying a resource requirement of the ML problem and available resources. The embodiment may include enabling user configuration of the contextual parameters in an interactive augmented reality (AR) view. The embodiment may include identifying a set of clusters upon which to execute computing tasks of the ML problem. The set of clusters is identified out of the available resources. The embodiment may include implementing a ML evaluation process to determine an optimized load distribution model for execution of the computing tasks within the set of clusters. The embodiment may include implementing the optimized load distribution model.

20 Claims, 5 Drawing Sheets

(56) References Cited

U.S. PATENT DOCUMENTS

| | | | |
|---|---|---|---|
| 2014/0189702 A1* | 7/2014 | Yan | G06F 9/5027 |
| | | | 718/104 |
| 2018/0046518 A1 | 2/2018 | Shear | |
| 2018/0129972 A1* | 5/2018 | Chen | G06F 40/44 |
| 2019/0066016 A1* | 2/2019 | Ghosh | G06Q 10/0633 |
| 2019/0066381 A1* | 2/2019 | Estable | H04N 7/147 |
| 2020/0286297 A1 | 9/2020 | Edwards | |
| 2021/0035179 A1 | 2/2021 | Mishra | |
| 2022/0012089 A1* | 1/2022 | Nasr-Azadani | G06N 5/04 |
| 2022/0413932 A1* | 12/2022 | Telang | G06F 9/505 |
| 2024/0160491 A1* | 5/2024 | Taneja | G06F 9/5077 |
| 2024/0220831 A1* | 7/2024 | Wyman | G06N 20/00 |

OTHER PUBLICATIONS

Duong et al., "Distributed Machine Learning on IAAS Clouds," IEEE, Proceedings of CCIS2018, Downloaded May 13, 2021, https://ieeexplore.ieee.org/stamp/stamp.jsp?tp=&arnumber=8691150, 5 pages.

Karn et al., "Dynamic Autoselection and Autotuning of Machine Learning Models for Cloud Network Analytics," IEEE Transactions on Parallel and Distributed Systems, vol. 30, No. 5, May 2019, https://ieeexplore.ieee.org/stamp/stamp.jsp?tp=&arnumber=8500348, pp. 1052-1064.

Li et al., "Cross-Cloud MapReduce for Big Data," IEEE Transactions on Cloud Computing, vol. 8, No. 2, Apr.-Jun. 2020, https://ieeexplore.ieee.org/stamp/stamp.jsp?tp=&arnumber=7229313, pp. 375-386.

Mell et al., "The NIST Definition of Cloud Computing", National Institute of Standards and Technology, Special Publication 800-145, Sep. 2011, 7 pages.

Perry, "Multicloud Storage: Multicloud Kubernetes: Centralizing Multicloud Management," NetApp, Apr. 30, 2020, Retrieved from the Internet: https://cloud.netapp.com/blog/gcp-cvo-blg-multicloud-kubernetes-centralizing-multicloud-management, 7 pages.

Rake, "Hybrid Cloud Market Outlook—2025," Allied Market Research, Accessed: May 13, 2021, Retrieved from the Internet: https://www.alliedmarketresearch.com/hybrid-cloud-market, 8 pages.

Verified Market Research, "Coud Services Brokerage Market Size And Forecast," Accessed: May 13, 2021, Retrieved from the Internet: https://www.verifiedmarketresearch.com/product/cloud-services-brokerage-market/, 8 pages.

\* cited by examiner

INTERACTIVE AUGMENTED REALITY BASED OPTIMIZATION OF MACHINE LEARNING MODEL EXECUTION ON HYBRID CLOUD

BACKGROUND

The present invention relates generally to the field of computing, and more particularly to cloud computing and cloud service broker applications.

Cloud computing relates to on-demand access, via the internet, to computing resources (e.g., application software, physical servers, virtual servers, data storage, development tools, networking capabilities, etc.) hosted at a remote data center managed by a cloud service provider (CSP). The CSP may make these resources available for a monthly subscription fee or may bill them according to usage. The term 'cloud computing' also refers to the technology that makes cloud work. This includes some form of virtualized information technology (IT) infrastructure—servers, operating system software, networking, and other infrastructure that's abstracted, using special software, so that it can be pooled and divided irrespective of physical hardware boundaries. Cloud computing offers an enterprise with benefits such as lower IT costs, improved agility and time-to-value in terms of application development, and improved scalability in computing capacity. Such benefits are especially advantageous to an enterprise engaged in the collection and analysis of large data sets (i.e., big data) which are typically too large or complex to be dealt with solely by traditional on-premises data processing capability of the enterprise. The processing of big data demands a large computational infrastructure for data analysis which cloud service providers may enable via a Software-as-a-Service (SaaS) in a hybrid cloud model.

There are many possible cloud service providers available in the market and each of them have their own offerings and pricing models as well as their own advantages and disadvantages in terms of performance and flexibility. A cloud service consumer may choose to use one or multiple CSPs to execute a computing intensive task, such as machine learning (ML) analysis of big data. Cloud services brokerage (CSB) is an IT role and business model in which an entity adds value to one or more, public or private, cloud services on behalf of one or more consumers of that service. A cloud broker (CB) is an entity that acts as an intermediary between a cloud services consumer and one or more CSPs. Cloud brokers help manage services implemented on hybrid clouds and integrate these platforms with the systems and cloud-based applications deployed at a cloud consumer's premises with the aim of making the service more secure and specific to the consumer.

SUMMARY

According to one embodiment, a method, computer system, and computer program product for cloud service brokerage. The embodiment may include receiving a data set and user defined contextual parameters relating to a machine learning (ML) problem of a user to be performed on the data set. The embodiment may include identifying a resource requirement of the ML problem and available resources. The embodiment may include enabling user configuration of the contextual parameters in an interactive augmented reality (AR) view. The embodiment may include identifying a set of clusters upon which to execute computing tasks of the ML problem. The set of clusters is identified out of the available resources. The embodiment may include implementing a ML evaluation process to determine an optimized load distribution model for execution of the computing tasks within the set of clusters. The embodiment may include implementing the optimized load distribution model.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to cloud computing and cloud service broker applications. The following described exemplary embodiments provide a system, method, and program product to, among other things, identify a resource requirement of a given ML problem and then dynamically determine an optimized grouping of cloud providers to enable a hybrid cloud solution for the given ML problem based on the resource requirement and user defined contextual requirements, while allowing for control and interaction of the user in an AR view. Therefore, the present embodiment has the capacity to improve the technical field of cloud services brokerage applications by providing, via an AR view, the user with greater insights and control when selecting an optimal execution plan for a given computing intensive task, thus making the execution of a computing intensive task in a hybrid cloud environment more efficient.

As previously described, cloud computing relates to on-demand access, via the internet, to computing resources (e.g., application software, physical servers, virtual servers, data storage, development tools, networking capabilities, etc.) hosted at a remote data center managed by a CSP. The CSP may make these resources available for a monthly subscription fee or may bill them according to usage. The term 'cloud computing' also refers to the technology that makes cloud work. This includes some form of virtualized IT infrastructure—servers, operating system software, networking, and other infrastructure that's abstracted, using special software, so that it can be pooled and divided irrespective of physical hardware boundaries. Cloud computing offers a cloud service consumer with benefits such as lower IT costs, improved agility and time-to-value in terms of application development, and improved scalability in computing capacity. Such benefits are especially advantageous to a consumer engaged in the collection and analysis of large data sets (i.e., big data) which are typically too large or complex to be dealt with solely by traditional on-premises data processing capability of the consumer. The processing of big data demands a large computational infrastructure for data analysis which cloud service providers may enable via a Software-as-a-Service (SaaS) in a hybrid cloud model.

There are many possible CSPs available in the market and each of them have their own offerings and pricing models as well as their own advantages and disadvantages in terms of performance and flexibility. A cloud service consumer may choose to use one or multiple CSPs to execute a complex computing intensive task, such as ML analysis of big data. As previously mentioned, a cloud broker is an entity that acts as an intermediary between a cloud services consumer and one or more CSPs. Cloud broker applications help manage services implemented on hybrid clouds (e.g., ML analysis of big data) and integrate these platforms with the systems and cloud-based applications deployed at a cloud consumer's premises with the aim of making the services more secure and specific to the consumer.

For example, in the context of a computationally intensive complex machine learning problem, if a user (e.g., a startup company) were to rely solely on its on-premises local computation power, the cost associated with solving the machine learning problem may be low, but time and security aspects associated with the solution processing may be compromised. On the other hand, if the user were to use a proven public cloud service from a reputed cloud provider, the cost of solving the machine learning problem may be prohibitively high, particularly for a startup company. Consequently, such a user requires a cost-effective solution with a speedy delivery. There are known systems where the user can distribute computational tasks associated with the computationally intensive machine learning problem among a cross cloud architecture (i.e., a hybrid multi-cloud strategy) which will apply known MapReduce techniques over the cloud. However, as data sets associated with machine learning problems grow and the complexity of such problems goes up to nondeterministic polynomial-time (NP) hardness, there is a need for user intervention and user customization in terms of specifying the requirements (e.g., execution time, security standards, etc.) which determine the cloud load (e.g., computational tasks) distribution and execution. During such user intervention, the user may benefit from seeing a visualization of the parallel execution of distributed tasks in run-time and have the ability to repeat or redistribute the cloud load distribution according to the best available model. It may therefore be imperative to have a system in place to provide an interactive AR view through which a user can configure and evaluate cloud load distribution, as well as propose an optimized model for distributing and normalizing computational tasks of a given machine learning problem, out of multiple possible combinations, among different cloud providers in a hybrid cloud environment. Thus, embodiments of the present invention may be advantageous to, among other things, automatically identify resources required to solve a machine learning problem, automatically identify available cloud service provider accounts of a user, provide an actionable augmented reality view through which a user may visualize and manipulate entire data flow and task distribution of the machine learning problem, and dynamically recommend an optimized grouping of cloud service providers to enable a hybrid cloud solution to the machine learning problem. The present invention does not require that all advantages need to be incorporated into every embodiment of the invention.

According to at least one embodiment, when a user is faced with a given complex machine learning problem, a data set of the machine learning problem and user contextual requirements may be received from the user via a cloud brokerage program. The resources required to solve the machine learning program may be automatically identified as well as any cloud service provider accounts of the user which are available to enable the solution of the ML problem. According to at least one embodiment, an interactive AR view is provided through which the user may configure, manipulate, and distribute computational tasks of the ML problem across identified cloud service providers. According to at least one other embodiment, the user may interact, via natural language, with one or more dynamically created artificial intelligent (AI) avatars to control run-time execution of computational tasks of the ML problem. A selection of cloud service providers to enable a hybrid cloud solution for the given complex ML problem may be recommended based on the user contextual requirements and analysis of run-time execution of the computational tasks of the ML problem across identified cloud service providers. According to at least one other embodiment, on-premises computation resources of the user may be included in the hybrid cloud solution for the given ML problem.

According to at least one embodiment, the resources required to solve a given ML problem may be automatically identified. CSP accounts of the user and available on-premises computation devices may also be automatically identified. Computation task load of the given ML problem may be distributed across different CSPs and/or available on-premises computation devices such that available resources of the cloud providers and the local hardware are optimally distributed in a way that satisfies user contextual parameters related to the ML problem and solves the ML problem. Contextual parameters may include, for example, one or more parameters relating to a time constraint for overall execution of the ML problem, a monetary cost constraint for solving the ML problem, computing resources available to solve the ML task (e.g., CSP accounts and/or on-premise resources of the user), preferred geographic locations for execution of the ML problem, desired CSP and/or on-premise security standards for execution of the ML problem, preferred CSPs, preferred weightages on CSP utilization, excluded CSPs and/or on-premise resources, computing performance metrics of CSPs and/or on-premise resources, and any other specific requirement from the user.

According to at least one embodiment, a ML problem may be broken down into sub-tasks of the ML problem. Sub-tasks of the overall ML problem may be dynamically distributed across one or more CSPs and/or available on-premises computation devices for execution based on contextual parameters of the ML problem. Computational outputs resulting from the distributed sub-task execution may be merged.

According to at least one embodiment, a user may provide contextual parameters related to a given ML problem via natural language or a free text conversational message. In response, a possible load distribution of sub-tasks of the ML problem which best fits the contextual parameters may be provided to the user in an interactive AR view. Within the AR view, an emoji may be created for each CSP. A percentage usage of resources and associated cost may be shown as a water level within a CSP emoji to enable a user to quickly approve and distribute the load.

According to at least one embodiment, a user may visualize the parallel execution of sub-tasks of a given ML problem distributed across different CSPs and/or on-premises physical machines in an interactive AR view. Within the AR view, the user may record a sub-task execution block from one CSP and replay that sub-task execution block back on another CSP and then use the normalized output from both playbacks. Within the AR view, record and playback of a sub-task execution block across CSP may be controlled via hand gestures and/or natural language commands of the user.

According to at least one embodiment, an artificially intelligent (AI) avatar may be dynamically created within an AR view. A principal AI avatar may be created for the entire ML task distribution process and/or multiple CSP specific AI avatars may be created. Created AI avatars may be trained on contextual parameters related to a given ML problem. A user may interact with any created AI avatar via natural language within the AR view.

According to at least one embodiment, the user may seamlessly use, via a pre-approved key mechanism, a colleague machine (i.e., an on-premises resource either present locally or remotely, to handle a portion of computation load of sub-task distribution when solving a given ML problem provided the machine is in an idle state to ensure that the peer user is not disturbed.

According to at least one embodiment, a recommendation engine may be created which recommends revenue generating models that a user may implement when utilizing particular CSPs so as to improve the user's cloud usage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine an optimized selection of CSPs and/or on-premises resources to enable a hybrid cloud solution for a given ML problem.

Figure 1:
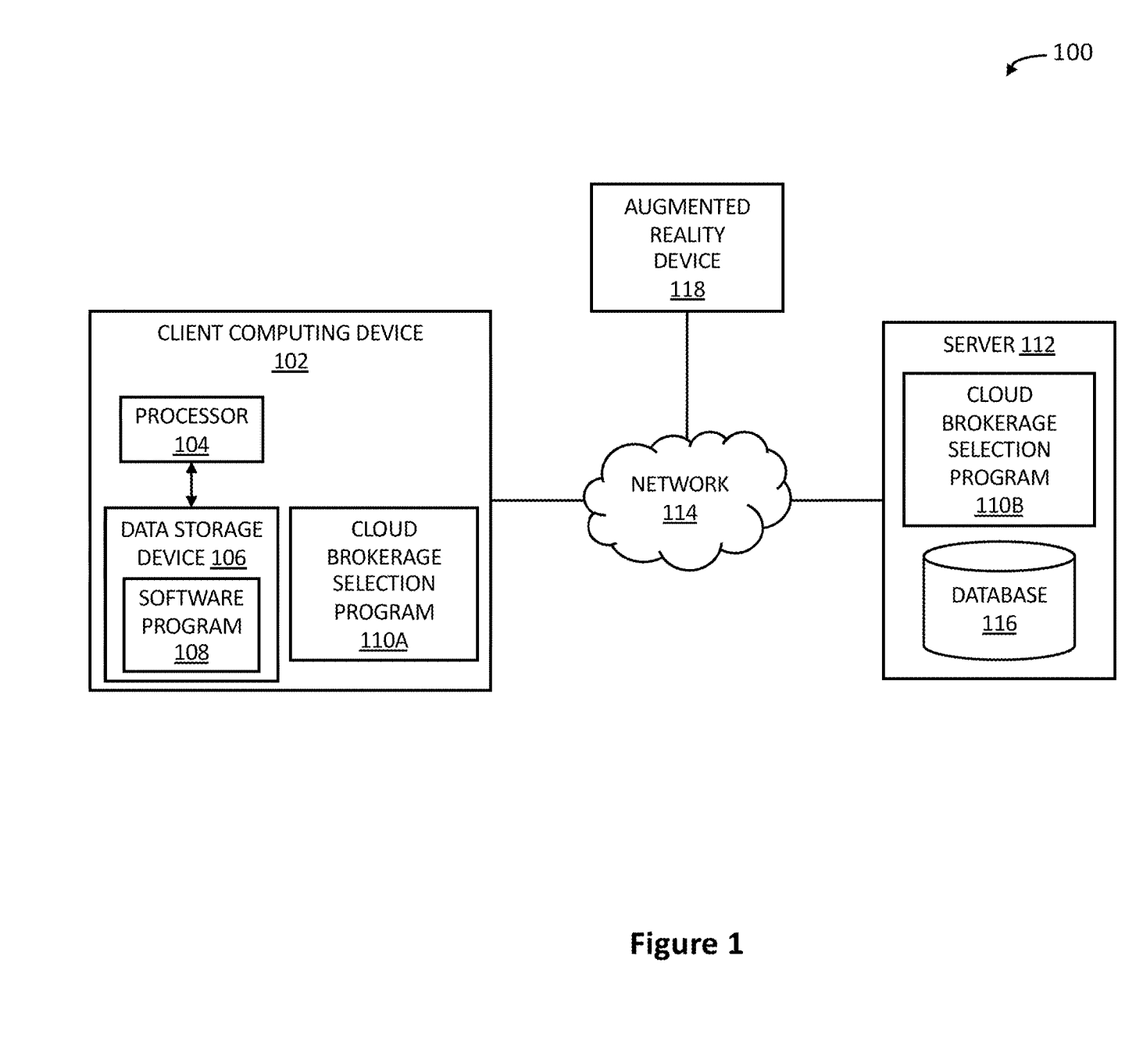
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and augmented reality device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a cloud brokerage selection program 110A and communicate with the server 112 and augmented reality device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a cloud brokerage selection program 110B and a database 116 and communicating with the client computing device 102 and augmented reality device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS), and may host cloud services of multiple cloud service providers. The server 112 may also be located in a cloud computing deployment model, such as a private cloud, community cloud, public cloud, or hybrid cloud.

According to at least one embodiment, augmented reality device 118 may be any device which allows a user to perceive an augmented reality environment. The augmented reality device 118 may be any device equipped with a display that can render a virtual environment with virtual objects therein, and hardware or software that enables the device to track location and motion of the virtual objects relative to the virtual environment and/or the physical world, as well as motion of the user. Users may wear or utilize augmented reality device 118 while experiencing the augmented reality environment. The augmented reality device 118 may be a general-purpose device owned by users or may be customized or specialized for an individual augmented reality experience or class of augmented reality experiences. Augmented reality devices 118 may include such devices as virtual reality headsets with built-in microphones, augmented reality headsets with built-in microphones, smart glasses, smart contact lens, augmented/virtual reality gloves, tablets, mobile phones, or any other augmented reality device 118 known in the art for creating and interacting with an augmented reality environment that is capable of connecting to the communication network 114, and transmitting and receiving data with the cloud brokerage selection program 110A residing within client computing device 102 and the cloud brokerage selection program 110B residing within server 112.

According to the present embodiment, the cloud brokerage selection program 110A, 110B may be a program capable of receiving a data set and user requirements relating to a machine learning problem of a user, enabling AR interactivity of the user in a virtual environment in which the user may select available cloud service providers in a hybrid cloud environment to solve their machine learning problem, and recommending an optimized selection of cloud services providers to enable a hybrid cloud solution for the given machine learning problem. The cloud brokerage analyzation method is explained in further detail below with respect to FIG. 2.

Figure 2:
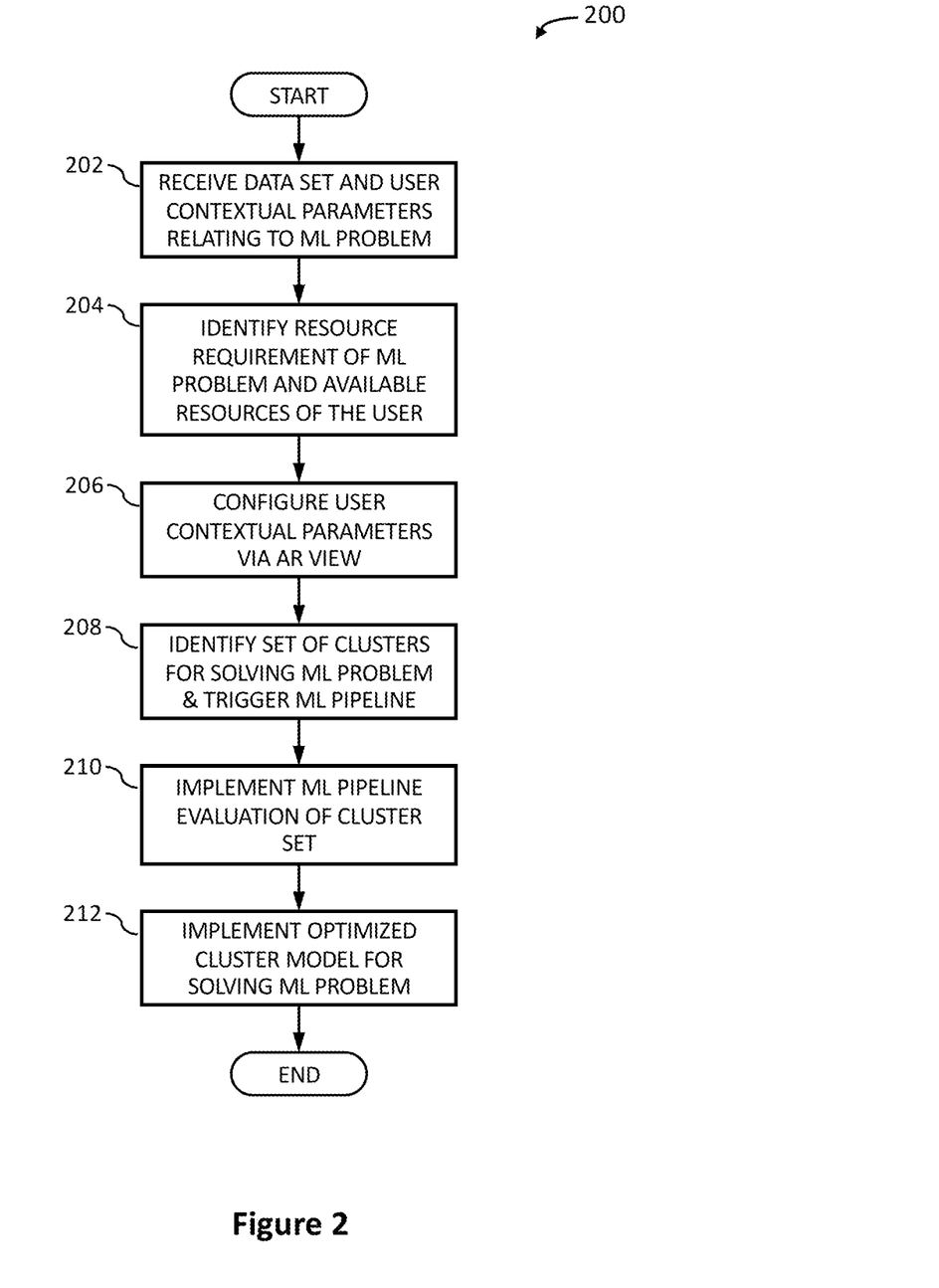
FIG. 2 illustrates an operational flowchart for determining a cloud brokerage selection process according to at least one embodiment.

Referring now to FIG. 2, an operational flowchart for determining a cloud brokerage selection in a cloud brokerage analyzation process 200 is depicted according to at least one embodiment. At 202, the cloud brokerage selection program 110A, 110B may receive a data set, and associated metadata, relating to a ML problem/task (e.g., ML analysis of big data) of a user. The data set and its associated metadata may be stored within database 116 and/or data storage device 106 and may be represented in a table format with columns and rows; each row representing a data point. Additionally, at 202, the cloud brokerage selection program 110A, 110B may receive user defined contextual parameters relating to the ML task. The contextual parameters may include, for example, one or more parameters relating to a time constraint for overall execution of the ML task, a monetary cost constraint for performing the ML task, computing resources available to the user to solve the ML task (e.g., CSP accounts and/or on-premise resources), preferred geographic locations for execution of the ML task, desired CSP and/or on-premise security standards for execution of the ML task, preferred CSPs, preferred weightages on CSP utilization, excluded CSPs and/or on-premise resources, computing performance metrics of CSPs and/or on-premise resources, and any other specific requirement from the user. According to at least one embodiment, the user defined contextual parameters may be stored within database 116 and/or data storage device 106 for access by the cloud brokerage selection program 110A, 110B. According to at least one other embodiment, the cloud brokerage selection program 110A, 110B may receive the user defined contextual parameters from the user via natural language input in an interactive AR view representation of the ML problem space. The natural language input of the user may be received by a microphone of the augmented reality device 118 and/or the client computing device 102.

At 204, the cloud brokerage selection program 110A, 110B may identify a computing resource requirement for performing the given ML task and may also identify computing resources available for use in performing the given ML task. The computing resource requirement for performing the ML task may be based, at least, on the size of the data set and the ML task to be performed on the data set (e.g., classification of big data). Available resources may include one or more CSPs for which the user has an identifiable account and/or one or more on-premises computing devices (e.g., client computing device 102) accessible by the cloud brokerage selection program 110A, 110B. In identifying a CSP account of a user for use in performing the given ML task, the cloud brokerage selection program 110A, 110B may establish a channel with the CSP using lightweight directory access protocol (LDAP) calls with OAuth 2.0 standards of authorization to ensure trust and security. The identified one or more on-premises computing devices may be part of a pre-established peer group of computing devices having available computation capability and which are locally or remotely accessible. Computing devices of the pre-established peer group may have configured public and private keys for access authorization. The cloud brokerage selection program 110A, 110B may access an identified on-premises computing device of the pre-established peer group using the appropriate keys. In identifying one or more on-premises computing devices for use in performing the given ML task, the cloud brokerage selection program 110A, 110B may verify that the identified on-premises computing device is in an idle state, thereby ensuring that a peer user of the identified on-premises computing device is not disturbed.

At 206, the cloud brokerage selection program 110A, 110B may enable user configuration of the contextual parameters relating to the ML task via an interactive AR view. According to at least one embodiment, the cloud brokerage selection program 110A, 110B may utilize known augmented reality techniques to create the interactive AR view representation of the ML problem space. The interactive AR view representation of the ML problem space may include a rendered virtual object representation for the given ML task, one or more rendered virtual object representations for sub-tasks of the given ML task, a rendered virtual object representation for the computing resource requirement to perform the given ML task, a rendered virtual object representation for each contextual parameter, and a rendered virtual object representation for each identified available resource (e.g., CSPs with established channels, peer group devices in an idle state). The rendered virtual objects may be visible to the user, and acted upon by actions of the user, within the AR view via the augmented reality device 118. According to at least one embodiment, the cloud brokerage selection program 110A, 110B may render, within the interactive AR view representation of the ML problem space, an emoji for each CSP with an established channel and an emoji for each identified on-premises computing device in an idle state. A percentage utilization indicator and an associated cost indicator may be displayed either within an emoji (e.g., as a water level within the emoji) or next to an emoji. In enabling user configuration of the contextual parameters within the interactive AR view, the cloud brokerage selection program 110A, 110B may, for example, enable user actions, such as, addition, deletion, selection, or deselection of one or more contextual parameters for the cloud brokerage selection program 110A, 110B to consider when executing the given ML task. The cloud brokerage selection program 110A, 110B may also enable, via the interactive AR view, user actions, such as, adjustment of contextual parameters (e.g., changes in time, changes in cost), assignment of percentage utilizations of identified resources, distribution of sub-tasks across identified resources, selection of preferred resources to use when executing the given ML task, and selection of resources to exclude when executing the given ML task.

According to one embodiment, the user actions may be implemented in the interactive AR view as drag-and-drop operations of the user, and/or hand gestures of the user, utilizing the augmented reality device 118. According to another embodiment, the user actions may be implemented through natural language (e.g., voice commands) of the user input into the cloud brokerage selection program 110A, 110B via the augmented reality device 118. According to yet another embodiment, the user actions may be implemented within the interactive AR view as the result of interaction of the user with one or more AI avatars rendered by the cloud brokerage selection program 110A, 110B within the AR view using known techniques. The cloud brokerage selection program 110A, 110B may create a single principal AI avatar which may oversee the ML task execution and may be available for user interaction throughout the ML task execution process. The cloud brokerage selection program 110A, 110B may train the created principal AI avatar on the contextual parameters relating to the ML task and attributes of the identified available resources. The cloud brokerage selection program 110A, 110B may also create one or more resource specific AI avatars (e.g., a CSP specific avatar), trained on the contextual parameters and attributes of a specific resource, which may be available for user interaction within the AR view. The user may utilize the augmented reality device 118 to interact with any created AI avatar within the AR view via text and/or natural language input.

Then, at 208, the cloud brokerage selection program 110A, 110B may identify a set of feasible clusters for use in solving the given ML problem based on the received data set, the given ML task, the identified resources, the provided contextual parameters, and the user provided configurations. In embodiments of the invention, a cluster may represent a portion of available resources (e.g., available memory space, a virtual machine, etc.) and may be formed/appropriated out of the identified computing resources available for use in performing the given ML task. For example, given a ML big data classification problem, the user may, within the interactive AR view, configure related contextual parameters such as to specify that the solution to the ML problem (i.e., a generated cluster load distribution model) have an associated cost of not more than X-dollar amount and an execution time of not more than X-minutes. In response, the cloud brokerage selection program 110A, 110B may automatically evaluate identified available resources (e.g., CSPs with established channels, peer group devices in an idle state) and identify an optimized cluster load distribution model for use in solving the given ML problem (i.e., executing computing tasks of the ML problem) based on the related data set, the given ML task, identified resources, provided contextual parameters, and any user provided configurations. The identified cluster load distribution model may include a set of clusters which may be selected from the identified available resources. The cloud brokerage selection program 110A 110B may distribute one or more sub-tasks of the overall ML problem to each cluster within the set and later merge the computational outputs of each cluster as a solution to the overall ML problem. In continuing with the example above, the cloud brokerage selection program 110A, 110B may identify a cluster load distribution model in which 1 GB of memory is utilized from CSP_A, 500 MB of memory is utilized from CSP_B, and 20 MB of memory is utilized from on-premises computing devices for a total associated cost equaling the X-dollar amount and an execution time which does not exceed the X-minutes.

Additionally, at 208, having identified the set of feasible clusters for use in solving the given ML problem, the cloud brokerage selection program 110A, 110B may trigger a machine learning pipeline implementation of the identified set of feasible clusters in which possible combinations (i.e., models) of executing computing tasks of the ML problem, with varying contextual parameters, across the set of feasible clusters may be performed and evaluated using known ML techniques (e.g., random forest, deep neural networks, etc.).

In the present embodiment, at 210, the cloud brokerage selection program 110A, 110B may implement a ML pipeline evaluation of the set of feasible clusters identified at step 208. In implementing the ML pipeline evaluation of the cluster set, the cloud brokerage selection program 110A, 110B may perform a series of sub-steps, the first of which may be to identify how much free memory space is available within each cluster via application programming interface (API) calls to each cluster. Ascertaining the amount of available memory space within each cluster is necessary as the cloud brokerage selection program 110A, 110B may later divide the received data set relating to the ML problem into partitions based on the amount of memory space available in each cluster. Each partition must be small enough to be stored within the available memory space of a single cluster.

Secondly, before the data set is partitioned, the cloud brokerage selection program 110A, 110B may define data pre-processing and feature engineering definitions for the data set using its associated metadata. The associated metadata may contain categorical attributes of the data set which may contain fixed values. The associated metadata may also contain information on what type of value, or range of values, each column with the data set may possess. In essence, the associated metadata may provide a context of the data set which may be used when defining data pre-processing and feature engineering definitions so that the context is maintained across the clusters. Generally, a received data set may be in a raw form where, for example, some data points are missing and/or are outliers. Data pre-processing definitions may instruct a system on how to handle missing and/or outlying data points. For example, missing data points, such as a column value, may be filled with a mean, median, or mode value; and outlying data points, or data points which are not in coherence with what is expected, may be removed. The cloud brokerage selection program 110A, 110B may specify data pre-processing definitions prior to partitioning the data set so that the same data pre-processing methods are performed for data points within each cluster regardless of the number of data points within each cluster. Feature engineering is the process of using domain knowledge to extract features (e.g., a classification) from raw data. Feature engineering may also be used to, for example, normalize data points with respect to max value available from metadata. The cloud brokerage selection program 110A, 110B may specify feature engineering definitions prior to partitioning the data set so that the same features are extracted from all data points within each cluster. Defining data pre-processing and feature engineering definitions for the data set using its associated metadata may create data independence within the data set and enable the data set to be partitioned across the clusters. Having defined the data pre-processing and feature engineering definitions for the data set, the cloud brokerage selection program 110A, 110B may divide the data set relating to the ML problem into partitions based on the identified amount of memory space available in each cluster, such that a single cluster stores a single partition, and may apply the defined data pre-processing and feature engineering definitions into each cluster and store the results.

Thirdly, the cloud brokerage selection program 110A, 110B may begin to build one or more models of cluster load distribution. In building a model, the cloud brokerage selection program 110A, 110B may divide the given ML task into sub-tasks to be executed on the data set partitions within each cluster. Sub-tasks may be dynamically distributed among the set of feasible clusters in accordance with the contextual parameters. Additionally, a feature importance score may be calculated at each partition. Feature importance refers to techniques that assign a score to input features based on how useful they are at predicting a target value. Feature importance scores may play an important role in developing a predictive model, including providing insight into the data (e.g., identifying which feature may be most relevant to the target as interpreted by a domain expert), providing insight into the model (e.g., identifying which features are most important to a model), and providing the basis for dimensionality reduction (i.e., deleting features) and feature selection that can improve the efficiency and effectiveness of a predictive model on a given problem. Common examples of feature importance scores include statistical correlation scores, coefficients calculated as part of linear models, decision trees, and permutation importance scores.

A reduce operation may be performed on the feature importance scores from each partition in order to obtain a final feature set list and perform feature selection at each cluster. Features which are important to the given ML task may be kept while other features may be filtered out. A remaining one cluster with a maximum memory may be used as a primary cluster for MapReduce operations and will store a final result of combined cluster computational outputs. A cluster load distribution model may be interpreted as an equation with learned coefficients (i.e., components). The cloud brokerage selection program 110A, 110B may distribute the divided equation of the ML load distribution model among the set of feasible clusters and compute each portion of the equation on the different clusters. For example, if a ML load distribution model has been divided into 5 coefficients (i.e., 5 components) inside an equation, each coefficient information may be calculated on a cluster and later combined via an operation (e.g., a multiplication, an addition, etc.) specified in the equation in order to result in final model parameters (i.e., a final model output) to be used in making predictions. According to at least one embodiment, the equation of the ML cluster load distribution model is divided into components and the computation of each component is executed in parallel on each cluster, of the set of feasible clusters, and stored within the clusters. A reduce operation (e.g., a combination) may be performed on the stored computed component values within each cluster, which may be normalized, to result in an output of final model parameters (i.e., a final cluster load distribution model). Fourthly, having obtained final model parameters, the cloud brokerage selection program 110A, 110B may test/evaluate the model for accuracy (e.g., percentage of correct predictions).

According to at least one embodiment, during implementation of the ML pipeline evaluation the user may visualize an entire data flow distribution of sub-tasks that are being proposed by the cloud brokerage selection program 110A, 110B in an AR view. If there are multiple distribution models which satisfy the contextual parameters, the user may select and approve one or more of them in the Aft view via the augmented reality device 118.

According to at least one embodiment, during implementation of the ML pipeline evaluation, a user may visualize the parallel execution of sub-tasks distributed across different clusters in an interactive AR view, created by the cloud brokerage selection program 110A, 110B, where the user may record the sub-task execution block from one cluster and replay that sub-task execution block back on another cluster via hand gestures and/or natural language commands. For example, using the augmented reality device 118, the user may drag a rendered virtual object representation of the sub-task execution block from a virtual object representation of one CSP and drop it within a virtual object representation of another CSP. Further, the user may choose to utilize the normalized output from both the playbacks.

According to at least one embodiment, during implementation of the ML pipeline evaluation, the user may have rewind and playback capability of sub-task execution for one or more model components by instructing, via the augmented reality device 118, in natural language within the AR view created by the cloud brokerage selection program 110A, 110B, The cloud brokerage selection program 110A, 110B may record the user action and replay or rewind the model along with user suggested changes. The user may choose between the previous or revised model based on need.

Then, at 212, having received an optimized final cluster distribution model from the ML pipeline implemented at 210, the cloud brokerage selection program 110A, 110B may implement the final cluster distribution model to solve the given ML problem. Furthermore, the cloud brokerage selection program 110A, 110B may generate a trend of different contextual parameters on a time-line series and identify users, their past ML problems, and their contextual parameters at a given point of time. The generated trend may be used by the cloud brokerage selection program 110A, 110B to recommend a cluster load distribution model for a future ML problem of the user.

It may be appreciated that FIG. 2 provides only an illustration of one implementation and do not imply any limitations with regard to how different embodiments may be implemented. Many modifications to the depicted environments may be made based on design and implementation requirements.

Figure 3:
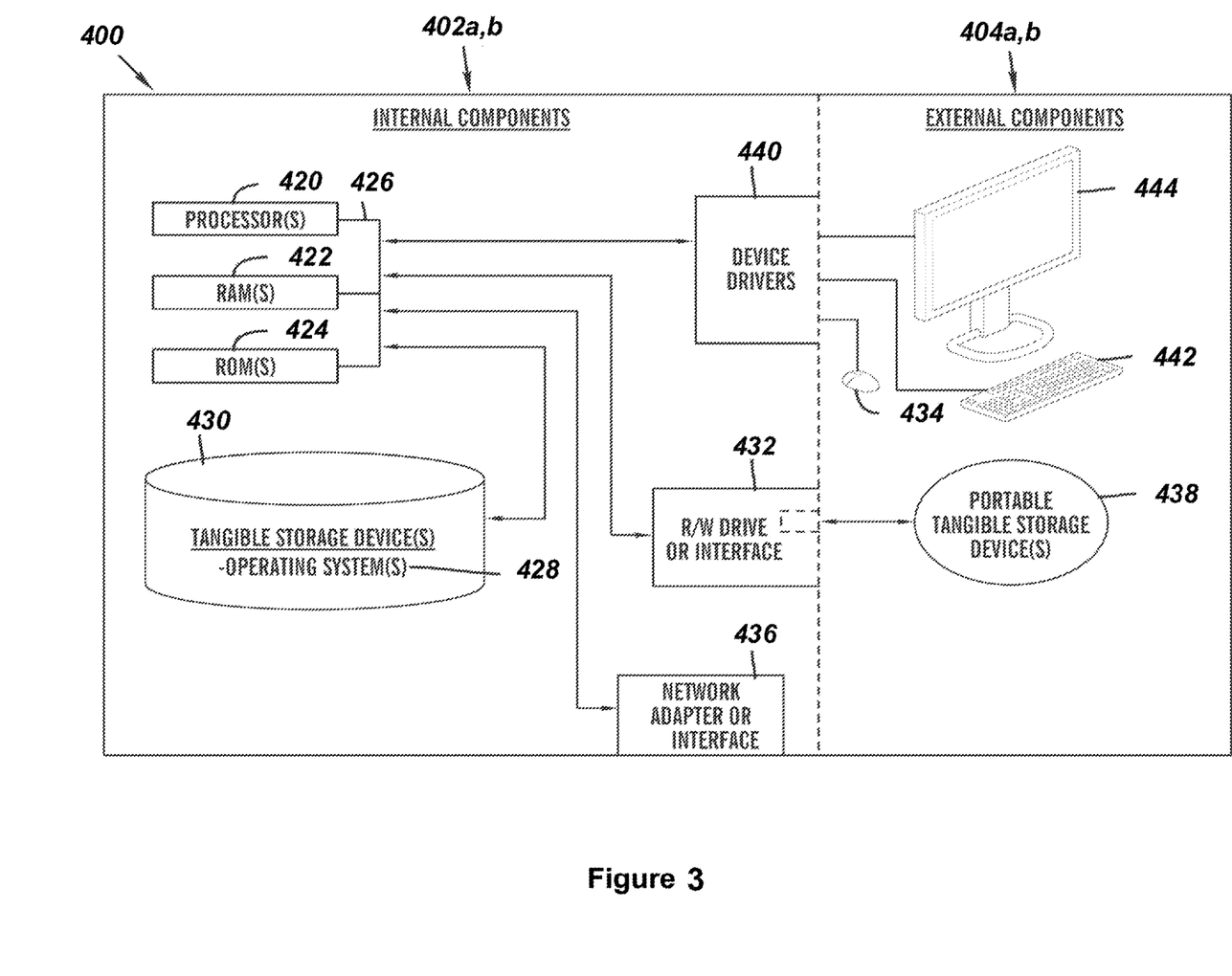
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the cloud brokerage selection program 110A in the client computing device 102 and the cloud brokerage selection program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the cloud brokerage selection program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the cloud brokerage selection program 110A in the client computing device 102 and the cloud brokerage selection program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the cloud brokerage selection program 110A in the client computing device 102 and the cloud brokerage selection program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
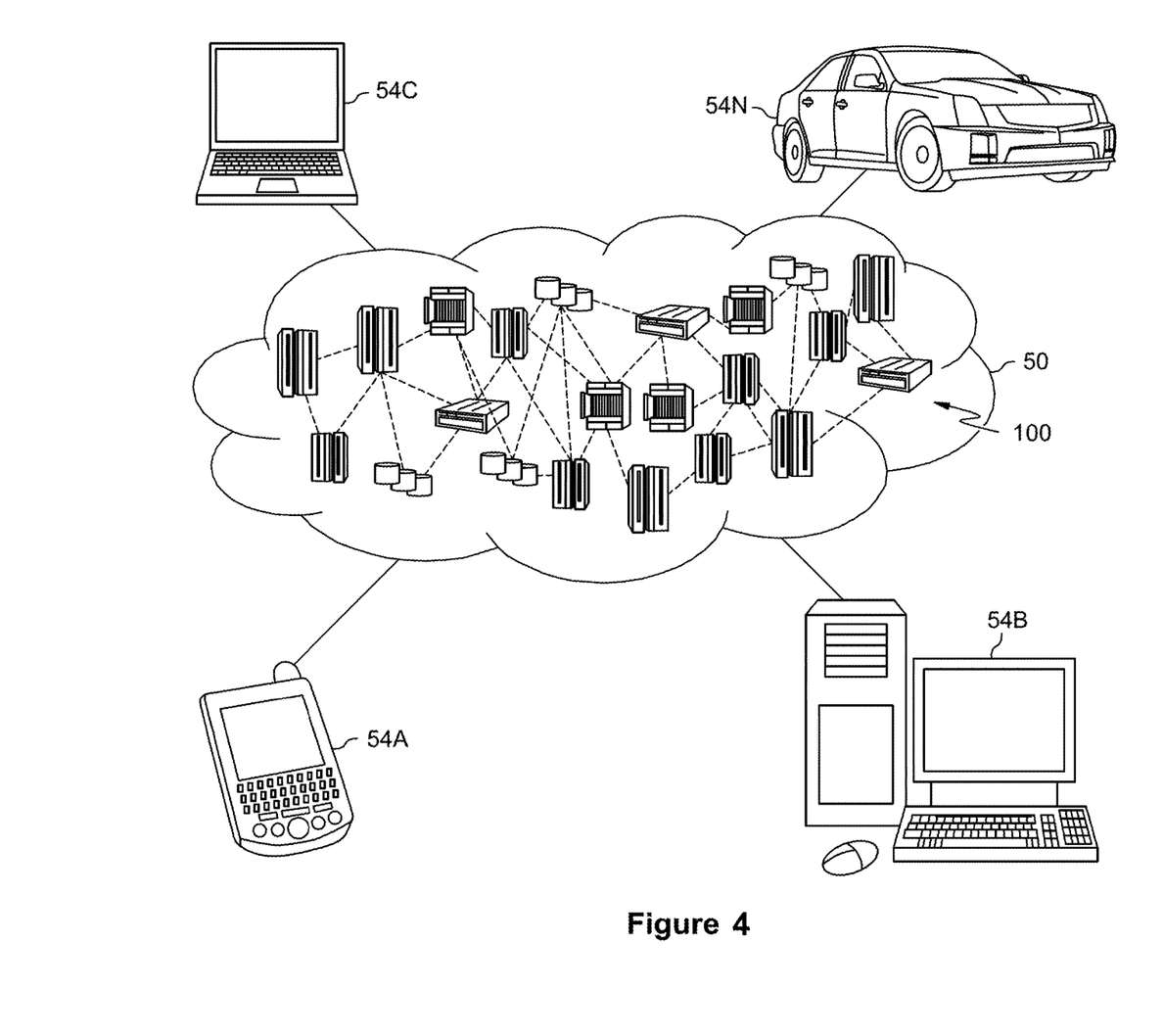
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
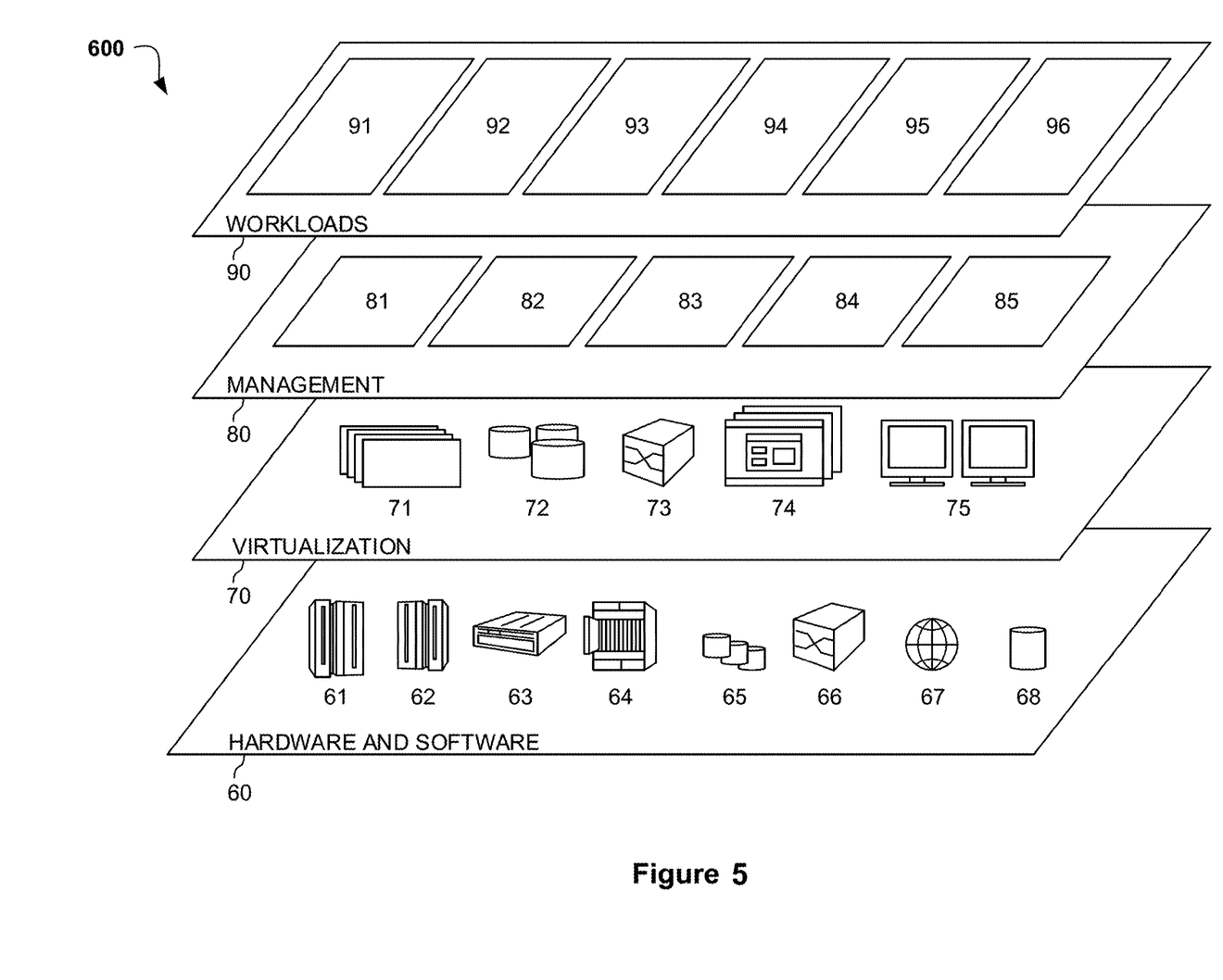
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud brokerage selection 96. Cloud brokerage selection 96 may relate to recommending an optimized selection of cloud services providers to enable a hybrid cloud solution for a given machine learning problem.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for a cloud service brokerage, the method comprising:
receiving a data set and user defined contextual parameters relating to a machine learning (ML) problem of a user to be performed on the data set;
identifying a resource requirement of the ML problem and available resources of the user;
enabling a user configuration of the user defined contextual parameters in an interactive augmented reality (AR) view;
identifying a set of clusters for executing computing tasks of the ML problem, wherein the set of clusters is identified out of the available resources;
defining data pre-processing and feature engineering definitions for the data set based on associated metadata of the data set;
in response to identifying available memory space within individual clusters of the set of clusters, partitioning the data set across the available memory space within the individual clusters of the set of clusters such that a single cluster stores a single partition;
implementing a ML evaluation process to determine an optimized load distribution model for executing the computing tasks within the set of clusters, wherein the ML evaluation process comprises distributing the computing tasks across the set of clusters; and
executing the computing tasks to optimize the load distribution model.

2. The method of claim 1, wherein the ML evaluation process further comprises:
applying the defined data pre-processing and feature engineering definitions within the individual clusters; and
combining computing task execution results from the clusters to derive final model parameters for the optimized load distribution model.

3. The method of claim 1, wherein the data set comprises: associated metadata, and
wherein the user defined contextual parameters are selected from a group consisting of:
one or more parameters relating to a time constraint for the executing of the computing tasks of the ML problem,
a monetary cost constraint for performing the ML problem, computing resources available to solve the ML problem,
preferred geographic locations for executing the ML problem,
desired computing resource security standards for executing the ML problem,
preferred cloud service providers,
preferred weightages on cloud service provider utilization,
excluded computing resources, and
computing performance metrics of computing resources.

4. The method of claim 1, wherein the resource requirement is based, at least, on the ML problem to be performed on the data set and a size of the data set, and
wherein the available resources comprise:
one or more cloud service providers for which the user has an identifiable account or one or more on-premises computing devices.

5. The method of claim 1, wherein the interactive AR view comprises a virtual representation of the ML problem, and
wherein the interactive AR view contains an element selected from a group consisting of:
a rendered virtual object representation for the given ML problem,
rendered virtual object representations for computing tasks of the ML problem,
a rendered virtual object representation for the resource requirement,
rendered virtual object representations for user defined contextual parameters, and
rendered virtual object representations for identified available resources.

6. The method of claim 5, wherein the actions of the user are implemented within the AR view as drag-and-drop operations of the user, hand gestures of the user, and/or natural language input of the user, and
wherein the actions of the user are selected from the group consisting of:
an addition of a contextual parameter,
a deletion of a contextual parameter,
a selection of a contextual parameter,
a deselection of a contextual parameter,
an adjustment of contextual parameters,
an assignment of percentage utilization of identified available resources,
a distribution of computing tasks across identified available resources,
a selection of preferred available resources, and
a selection of available resources to exclude.

7. The method of claim 5, wherein the interactive AR view comprises:
one or more rendered artificially intelligent (AI) avatars that are trained on the user defined contextual parameters relating to the ML problem and on attributes of the identified available resources, and
wherein the user interacts with the one or more rendered AI avatars within the AR view via text and/or natural language input to implement actions of the user in the AR view.

8. A computer system, comprising:
a processor that, when executing instructions stored in an associated memory, is configured to:
receive a data set and user defined contextual parameters relating to a machine learning (ML) problem of a user to be performed on the data set;
identify a resource requirement of the ML problem and available resources of the user;
defining data pre-processing and feature engineering definitions for the data set based on associated metadata of the data set;
in response to identifying available memory space within individual clusters of the set of clusters, partitioning the data set across the available memory space within the individual clusters of the set of clusters such that a single cluster stores a single partition;
enable a user configuration of the user defined contextual parameters in an interactive augmented reality (AR) view;
identify a set of clusters for executing computing tasks of the ML problem, wherein the set of clusters is identified out of the available resources;
implement a ML evaluation process to determine an optimized load distribution model for execution of the computing tasks within the set of clusters, wherein the ML evaluation process comprises distributing the computing tasks across the set of clusters; and
execute the computing tasks to optimize load distribution model.

9. The computer system of claim 8, wherein the ML evaluation process further comprises:
applying the defined data pre-processing and feature engineering definitions within the individual clusters; and
combining computing task execution results from the clusters to derive final model parameters for the optimized load distribution model.

10. The computer system of claim 8, wherein the data set comprises:
associated metadata, and
wherein the user defined contextual parameters are selected from a group consisting of:
one or more parameters relating to a time constraint for execution of the ML problem,
a monetary cost constraint for performing the ML problem,
computing resources available to solve the ML problem,
preferred geographic locations for execution of the ML problem,
desired computing resource security standards for execution of the ML problem,
preferred cloud service providers,
preferred weightages on cloud service provider utilization,
excluded computing resources, and
computing performance metrics of computing resources.

11. The computer system of claim 8, wherein the resource requirement is based, at least, on the ML problem to be performed on the data set and a size of the data set, and
wherein the available resources comprise:
one or more cloud service providers for which the user has an identifiable account or one or more on-premises computing devices.

12. The computer system of claim 8, wherein the interactive AR view comprises a virtual representation of the ML problem, and
wherein the interactive AR view contains an element selected from a group consisting of:
a rendered virtual object representation for the given ML problem, rendered virtual object representations for computing tasks of the ML problem,
a rendered virtual object representation for the resource requirement,
rendered virtual object representations for user defined contextual parameters, and
rendered virtual object representations for identified available resources.

13. The computer system of claim 12, wherein the actions of the user are implemented within the AR view as drag-and-drop operations of the user, hand gestures of the user, and/or natural language input of the user, and
wherein the actions of the user are selected from the group consisting of:
an addition of a contextual parameter,
a deletion of a contextual parameter,
a selection of a contextual parameter,
a deselection of a contextual parameter,
an adjustment of contextual parameters,
an assignment of percentage utilization of identified available resources,
a distribution of computing tasks across identified available resources,
a selection of preferred available resources, and
a selection of available resources to exclude.

14. The computer system of claim 12, wherein the interactive AR view comprises:
one or more rendered artificially intelligent (AI) avatars that are trained on the user defined contextual parameters relating to the ML problem and on attributes of the identified available resources, and
wherein the user interacts with the one or more rendered AI avatars within the AR view via text and/or natural language input to implement actions of the user in the AR view.

15. A computer program product comprising a computer readable storage medium storing instructions that, when executed by a processor, cause the processor to perform:
receiving a data set and user defined contextual parameters relating to a machine learning (ML) problem of a user to be performed on the data set;
identifying a resource requirement of the ML problem and available resources of the user;
enabling a user configuration of the user defined contextual parameters in an interactive augmented reality (AR) view;
identifying a set of clusters for executing computing tasks of the ML problem, wherein the set of clusters is identified out of the available resources;
defining data pre-processing and feature engineering definitions for the data set based on associated metadata of the data set;
in response to identifying available memory space within individual clusters of the set of clusters, partitioning the data set across the available memory space within the individual clusters of the set of clusters such that a single cluster stores a single partition;
implementing an ML evaluation process to determine an optimized load distribution model for executing the computing tasks within the set of clusters, wherein the ML evaluation process comprises distributing the computing tasks across the set of clusters; and
executing the computing tasks to optimize the load distribution model.

16. The computer program product of claim 15, wherein the distributing the computing tasks across the set of clusters further comprises:
distributing the computing tasks across the set of clusters based on the user defined contextual parameters,
wherein the executing the computing tasks to optimize the load distribution model further comprises:
executing the computing tasks on the partitions within the individual clusters of the set of clusters, and
wherein the implementing the ML evaluation process further comprises:
applying the defined data pre-processing and feature engineering definitions within the individual clusters; and
combining computing task execution results from the set of clusters to derive final model parameters for the optimized load distribution model.

17. The computer program product of claim 15, wherein the data set comprises associated metadata, and
wherein the user defined contextual parameters are selected from a group consisting of:
one or more parameters relating to a time constraint for the executing of the ML problem,
a monetary cost constraint for performing the ML problem,
computing resources available to solve the ML problem,
preferred geographic locations for executing the ML problem,
desired computing resource security standards for executing the ML problem,
preferred cloud service providers,
preferred weightages on cloud service provider utilization,
excluded computing resources, and
computing performance metrics of computing resources.

18. The computer program product of claim 15, wherein the resource requirement is based, at least, on the ML problem to be performed on the data set and a size of the data set, and
wherein the available resources comprise:
one or more cloud service providers for which the user has an identifiable account or one or more on-premises computing devices.

19. The computer program product of claim 15, wherein the interactive AR view comprises a virtual representation of the ML problem, and
wherein the interactive AR view contains an element from a group consisting of:
a rendered virtual object representation for the given ML problem,
rendered virtual object representations for computing tasks of the ML problem,
a rendered virtual object representation for the resource requirement,
rendered virtual object representations for user defined contextual parameters, and
rendered virtual object representations for identified available resources.

20. The computer program product of claim 19, wherein the actions of the user are implemented within the AR view as drag-and-drop operations of the user, hand gestures of the user, and/or natural language input of the user, and
wherein the actions of the user are selected from the group consisting of:
an addition of a contextual parameter, a deletion of a contextual parameter,
a selection of a contextual parameter,
a deselection of a contextual parameter,
an adjustment of contextual parameters,
an assignment of percentage utilization of identified available resources,
a distribution of computing tasks across identified available resources,
a selection of preferred available resources, and a selection of available resources to exclude.

* * * * *